(12) United States Patent
Brown et al.

(10) Patent No.: US 7,963,438 B2
(45) Date of Patent: Jun. 21, 2011

(54) SYSTEM AND METHOD FOR PERSONALIZING A CARD

(75) Inventors: Bradley Brown, Winnipeg (CA); David Fletcher, Winnipeg (CA); Richard Burchill, Winnipeg (CA); Annmarie D. Hart, Marblehead, MA (US); Ruth Deignan, Marblehead, MA (US); Lawrence R. Meyers, Rancho Palos Verdes, CA (US)

(73) Assignee: MagTek, Inc., Carson, CA (US)

( * ) Notice: Subject to any disclaimer, the term of this patent is extended or adjusted under 35 U.S.C. 154(b) by 1159 days.

(21) Appl. No.: 11/598,982

(22) Filed: Nov. 13, 2006

(65) Prior Publication Data

US 2007/0228158 A1    Oct. 4, 2007

Related U.S. Application Data

(60) Provisional application No. 60/735,354, filed on Nov. 10, 2005.

(51) Int. Cl.
*G06K 5/00* (2006.01)
(52) U.S. Cl. .............. 235/380; 235/382.5; 235/492
(58) Field of Classification Search .......... 235/380, 235/382.5, 492
See application file for complete search history.

(56) References Cited

U.S. PATENT DOCUMENTS

| | | |
|---|---|---|
| 3,116,820 A | 1/1964 | Owen |
| 4,088,216 A | 5/1978 | LaManna et al. |
| 4,180,338 A | 12/1979 | LaManna et al. |
| 4,370,071 A | 1/1983 | Habich et al. |
| 4,501,509 A | 2/1985 | Suzaki et al. |
| 4,686,898 A | 8/1987 | LaManna et al. |
| 4,747,706 A | 5/1988 | Duea |
| 4,784,059 A | 11/1988 | LaManna et al. |
| 4,900,168 A | 2/1990 | LaManna et al. |
| 4,930,911 A | 6/1990 | Sampson et al. |
| 4,960,047 A | 10/1990 | Lundstrom et al. |
| 4,969,760 A | 11/1990 | LaManna et al. |
| 4,995,501 A | 2/1991 | Lundstrom et al. |
| 5,009,332 A | 4/1991 | Sannel et al. |
| 5,025,399 A | 6/1991 | Wendt et al. |
| 5,044,793 A | 9/1991 | Wada |
| 5,070,781 A | 12/1991 | Lundstrom et al. |
| 5,072,620 A | 12/1991 | Hill et al. |
| 5,094,336 A | 3/1992 | Lundstrom et al. |
| 5,281,038 A | 1/1994 | Schofield et al. |
| 5,378,884 A | 1/1995 | Lundstrom et al. |
| 5,441,589 A | 8/1995 | Groswith, III et al. |
| 5,478,158 A | 12/1995 | Kondo et al. |
| 5,480,241 A | 1/1996 | Tietz |
| 5,503,514 A | 4/1996 | LaManna et al. |
| 5,546,462 A * | 8/1996 | Indeck et al. ............ 713/176 |
| 5,581,630 A | 12/1996 | Bonneau, Jr. |
| 5,614,707 A | 3/1997 | Lundstrom et al. |
| 6,016,745 A | 1/2000 | Bartel et al. |

(Continued)

*Primary Examiner* — Ahshik Kim
(74) *Attorney, Agent, or Firm* — Christie, Parker & Hale, LLP

(57) ABSTRACT

Systems and methods for personalizing data card are disclosed. One embodiment includes a card receiver configured to receive one or more data cards, a control system connected to the card receiver, the control system configured to receive personalization information, an encoder system connected to the control system, the encoder system configured to encode the one or more data cards with at least some portion of the personalization information, a card reader connected to the control system, the card reader configured to read magnetic fingerprint information from the one or more data cards, and the control system configured to store the magnetic fingerprint information.

31 Claims, 16 Drawing Sheets

U.S. PATENT DOCUMENTS

| | | |
|---|---|---|
| 6,105,493 A | 8/2000 | Skubic et al. |
| 6,202,155 B1 * | 3/2001 | Tushie et al. .................... 726/20 |
| 6,335,799 B1 * | 1/2002 | Provost .......................... 358/1.4 |
| 6,352,206 B1 | 3/2002 | Ashley et al. |
| 6,398,435 B1 | 6/2002 | Kozakai et al. |
| 6,484,935 B1 * | 11/2002 | Fischbacher ................. 235/376 |
| 6,781,614 B2 | 8/2004 | Pearson et al. |
| 7,143,935 B2 * | 12/2006 | Marta .......................... 235/380 |
| 7,341,181 B2 * | 3/2008 | Bonalle et al. ................ 235/380 |
| 7,500,601 B2 * | 3/2009 | Goman et al. ................ 235/380 |
| 2005/0236473 A1 * | 10/2005 | Lenz et al. .................... 235/380 |

* cited by examiner

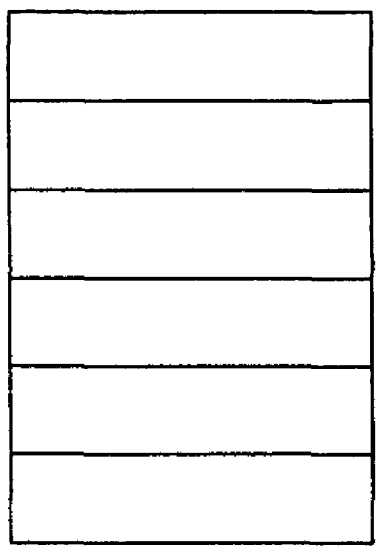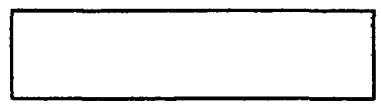
FIG. 10

850

852
Receive request for personalization information including information identifying a card user 854
Identify a record having personalization information based on the information identifying the card user 856
Send personalization information 858
Receive magnetic fingerprint information for a data card associated with the card user 860
Store magnetic fingerprint information of the data card in conjunction with the record

FIG. 14

SYSTEM AND METHOD FOR PERSONALIZING A CARD

RELATED APPLICATIONS

The present invention claims priority to U.S. Provisional Patent Application Ser. No. 60/735,354 filed on Nov. 10, 2005, the disclosure of which is incorporated herein by reference in its entirety.

BACKGROUND

The present invention relates to the transfer of card personalization information over a data network and the embossing of that card personalization information on a card such as a credit card, identification card, or other similar card.

The credit card industry is amongst the industries that print, emboss, or indent useful information on data cards. This information can include credit card numbers, expiration dates, along with holograms, pictures, corporate logos, etc.

SUMMARY OF THE INVENTION

The present invention relates to a system and method for personalizing a card. In one embodiment, the invention relates to a card personalization system including a card receiver configured to receive one or more data cards, a control system connected to the card receiver, the control system configured to receive personalization information, an encoder system connected to the control system, the encoder system configured to encode the one or more data cards with at least some portion of the personalization information, a card reader connected to the control system, the card reader configured to read magnetic fingerprint information from the one or more data cards, and the control system configured to store the magnetic fingerprint information.

In another embodiment, the system relates to a card personalization system including a card receiver configured to receive one or more data cards, a control system connected to the card receiver, the control system configured to receive personalization information, an encoder system connected to the control system, the encoder system configured to encode the one or more data cards with at least some portion of the personalization information, a printer connected to the control system, the printer configured to print at least some portion of the personalization information to the one or more data cards, and the printer configured to print using a printer ribbon comprising one or more portions, each portion having a different color.

In yet another embodiment, the invention relates to a system for embossing a data card including a first embosser wheel having a plurality of radially extending fingers, each of the fingers configured to receive a first hammer mechanism and to impart a character to the data card, a second embosser wheel having a plurality of radially extending fingers, the fingers configured to receive a second hammer mechanism and to impart a character to the data card, a first motor configured to drive the first hammer mechanism, and a second motor configured to drive the second hammer mechanism.

In still yet another embodiment, the invention relates to a method of personalizing a data card, including receiving a data card, receiving personalization information, encoding the data card with at least some portion of the personalization information, reading a magnetic fingerprint of the data card, storing the magnetic fingerprint, and printing at least some portion of the personalization information to the data card using a printer ribbon comprising a metallized resin portion.

In another embodiment, again the invention relates to a method of personalizing a data card including receiving a data card, receiving personalization information, encoding the data card with at least some portion of the personalization information, reading a magnetic fingerprint of the data card, storing the magnetic fingerprint, printing at least some portion of the personalization information to the data card including at least one character of the personalization information using a foil print, transporting the data card from a first location to a second location, embossing or indenting the data card with at least some portion of the personalization information including the at least one character, and determining whether the data card meets a predetermined criteria and, if not, rejecting the card.

In a further embodiment, the invention relates to a method of personalizing a data card, comprising receiving a data card, receiving personalization information, encoding the data card with at least some portion of the personalization information, reading a magnetic fingerprint of the data card, storing the magnetic fingerprint, and embossing the data card with at least some portion of the personalization information using two driving hammers.

In a further embodiment, the invention relates to a method of communicating with a card personalization system including receiving a request for personalization information, the request comprising information identifying a card user, identifying a record based on the information identifying the card user, the record comprising personalization information, sending the personalization information, receiving magnetic fingerprint information for a data card associated with the card user, wherein the magnetic fingerprint information comprises information indicative of unique characteristics of a magnetic stripe of the data card, and storing the magnetic fingerprint information in conjunction with the record.

BRIEF DESCRIPTION OF THE DRAWINGS

FIG. 10 is a block diagram of a memory system in accordance with an embodiment of the invention;

FIG. 14 is a flowchart of a process for communicating with a card personalization system in accordance with an embodiment of the invention;

DETAILED DESCRIPTION OF THE INVENTION

Figure 1:
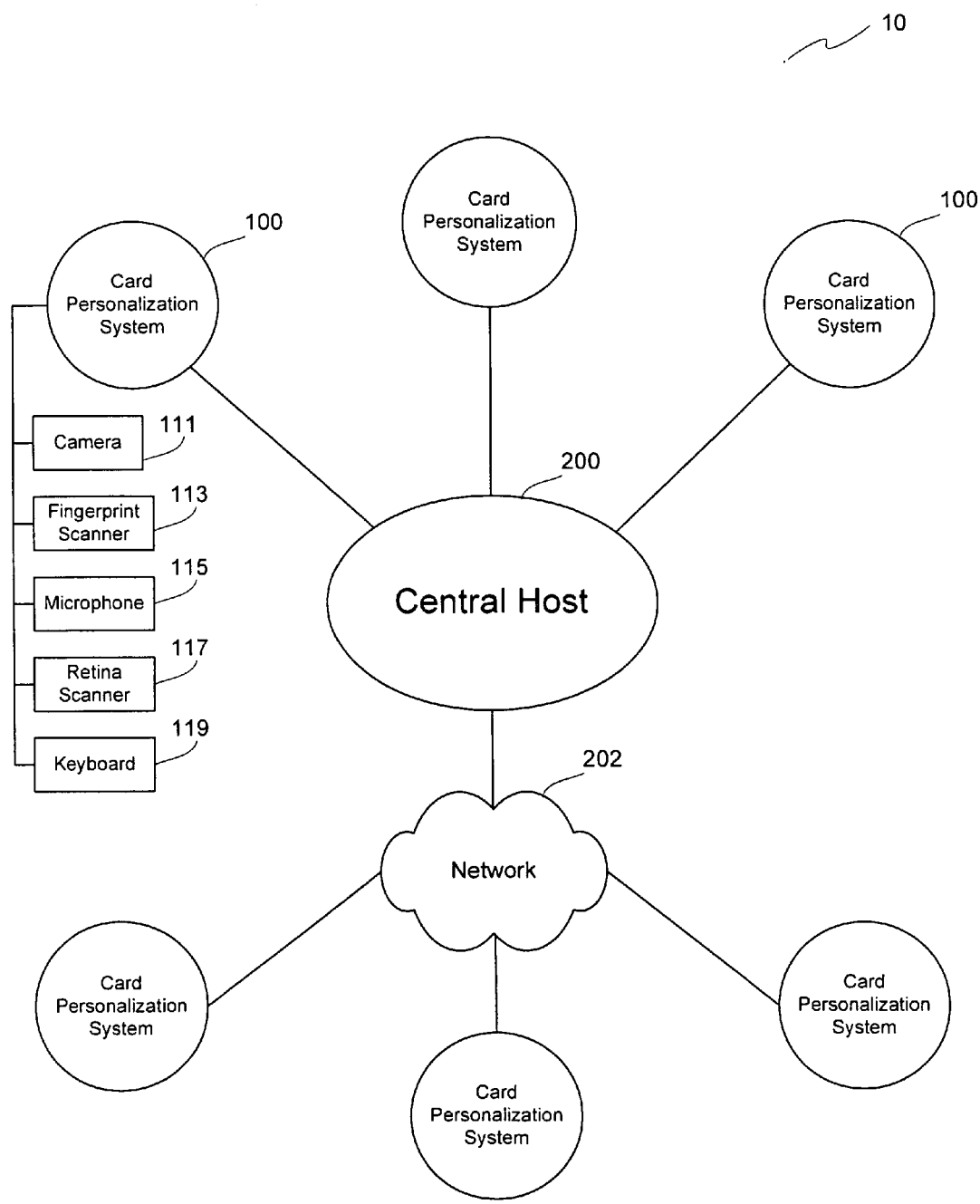
FIG. 1 is a schematic view of a network of card personalization systems in accordance with one embodiment of the invention.

Referring now to the drawings, embodiments of card personalization networks connecting hosts and card personalization systems are illustrated. Card personalization networks allow communication between central hosts having financial records or other identification records and card personalization systems using a variety of protocols. Card personalization systems enable the personalization of cards, often having a magnetic stripe (magstripe card), with information indicative of the card user. This information can often include the user's name, account number and the expiration date of the card. The cards to be personalized can include credit cards, identification cards and other cards capable of being encoded with personalization information.

The personalization process can be performed by a number of components in the card personalization system. For example, the path that a card passes through during the personalization process can include a manual insertion slot or card hopper, a flipper station, an encoder station, a printer module, a lateral card transport, a card embosser, a magnetic fingerprint reference station, a foil tipping station, a transfer module, a reject card hopper, a card exit transport and/or an exit hopper. These components are capable of encoding or enabling the encoding of personalization information to one or more blank cards often having a magnetic stripe or otherwise capable of storing information with the card.

A schematic view of a card personalization network in accordance with an embodiment of the invention is shown in FIG. 1. The card personalization network 10 includes a central host or server 200 which communicates directly with a plurality of card personalization systems 100 and/or via a network 202. The card personalization systems 100 can be physically remote, located for example at a branch bank, from the central host 200 which can be located at a different location such as a central data processing center. In one embodiment, a card personalization system 100 requests system information such as card number and expiration date, a subset of the card personalization information, for a particular card user. The central host 200 can respond by sending the requested system information to the card personalization system 100. The central host 200 can accommodate multiple requests simultaneously. While FIG. 1 shows six card personalization systems, other embodiments could have as few as one card personalization system or more than six such systems.

In one embodiment, the central host 200 can communicate with a card personalization system 100 using the XML (extensible markup language) protocol and a proprietary command set. In one embodiment, the physical connection can be Ethernet or USB (universal serial bus). In other embodiments, other protocols and physical mediums can be used to connect the central host 200 to multiple card personalization systems 100. For example, the central host 200 could use a private or public network 202 to communicate to any card personalization system 100. In one embodiment, all or a portion of the data communication over the network can be encrypted to protect the privacy of personalization data. Although a star like network topology is shown in FIG. 1, other network topologies can be used. Rather than a server/client network, a peer to peer network can be used. In a common embodiment, the communication can take place over a secure private data network.

In several embodiments, the card personalization system 100 can be connected to input devices including a camera 111, a fingerprint scanner 113, a microphone 115, a retina scanner 117, and/or a keyboard 119. These devices can be used to acquire further card personalization information from a user or to acquire access information from an operator. In one embodiment, connection to these devices is through the use of a personal computer, which is not shown. In many embodiments, the keyboard 119 is an input device for entering a PIN (personal identification number) in the form of a set of numbered buttons. In such case, the keyboard can allow the operator or card user to enter information unique to a given card user. This unique information can typically be a PIN for a card user. The card personalization system can store this unique information and verify the authenticity of the information with either the memory local to the card personalization system or a database having user and/or operator information on the central host or elsewhere on the network.

Figure 2:
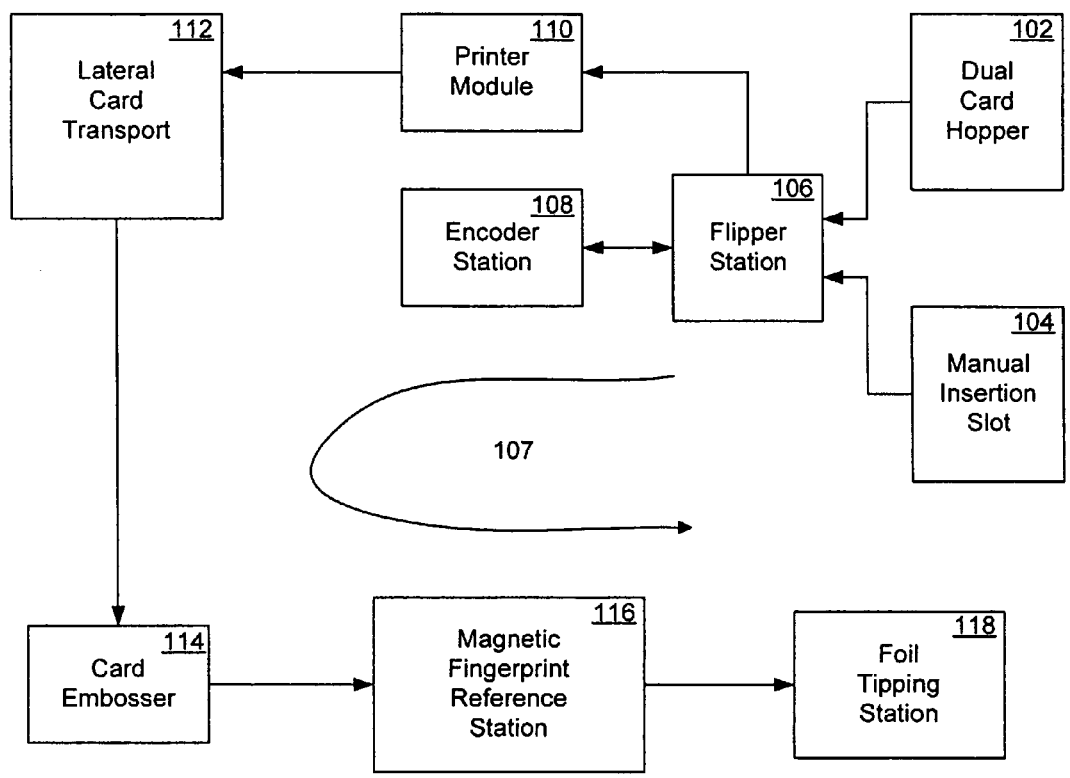
FIG. 2 is a block diagram of a card personalization system in accordance with an embodiment of the invention.

A block diagram of a card personalization system in accordance with an embodiment of the invention is shown in FIG. 2. The card personalization system includes a dual card hopper 102, a manual insertion slot 104, a flipper station 106, an encoder station 108, a printer module 110, a lateral card transport 112, a card embosser 114, a magnetic fingerprint reference station 116, and a foil tipping station 118. The dual card hopper 102 and manual insertion slot 104 are both connected to the flipper station 106 via the card path 107. The flipper station 106 is connected to the encoder station 108 and printer module 110 via the card path 107. The lateral card transport 112 is connected to the printer module 110 and the card embosser 114 via the card path 107. The magnetic fingerprint reference station 116 is connected to the card embosser 114 and the foil tipping station 118 via the card path 107. In many embodiments, the components of the card personalization system are modular and can be removed or additional components can be added. In other embodiments, the order of the components may also be rearranged. In many embodiments, individual card transport systems (not shown) move the data cards along the card path. In one embodiment, a single card transport system (not shown) moves the data cards along the card path and/or wherever needed.

In one embodiment, after card personalization information has been requested and received for a particular card user, a card enters the card path 107. The card can either enter via the dual card hopper 102 or the manual insertion slot 104, each of which can be thought of as a card receiver. In other embodiments, the insertion of a card can be brought about in other ways. In many embodiments, cards including graphics, embossing and/or other forms of personalization are used. In many embodiments, a card personalization system is used to modify information on a previously personalized card, such as modifying a PIN number.

The card can then enter the flipper station 106 where it may be rotated and aligned in preparation for the encoder station 108. In one embodiment, the card can then be advanced to the encoder station 108 where it is personalized with a unique magstripe and/or smartcard data as called for by the card personalization information. In one embodiment, data is recorded on a magnetic stripe located on the card. In another embodiment, data is recorded on a contact IC (integrated circuit) on the card. In a further embodiment, data is recorded on a contactless IC on the data card. The card can then be returned to the flipper station 106. In one embodiment, the flipper station 106 rotates and aligns the card in preparation for the printer module 110.

The printer module 110 can print graphics in either monochrome or color via a printer. In one embodiment, the printer uses a D2T2 thermal process to print on to the card. In other embodiments, other color schemes and other thermal processes can be used. In several embodiments, the card is returned to the flipper station 106 and rotated again to allow the printer module 110 to print on both the top and bottom sides of the card.

In one embodiment, the card is advanced from the printer module 110 using a lateral card transport 112. The lateral card transport 112 can advance the card to a card embosser 114. The card embosser 114 can emboss, indent, or print card personalization information as required on either side of the card. The embosser can also emboss or print using ribbons. The card can be advanced from the embosser to the magnetic fingerprint reference station 116. In many embodiments, the magnetic fingerprint reference station 116 obtains information indicative of the unique characteristics of the magnetic field of the magnetic stripe. In one embodiment, the information is obtained in accordance with the methods disclosed in U.S. Pat. No. 6,098,881 to Deland, Jr., et al. and U.S. Pat. Nos. 7,478,751, 7,210,627, 7,377,433, which are hereby incorporated by reference in their entirety.

In several embodiments, the card is advanced to a foil tipping station 118. The foil tipping station 118 can apply foil to certain embossed characters as called for by the card personalization information using a hot stamp process. The completed card can be advanced to a card exit and removed by an operator of the card personalization system 100. In another embodiment, multiple cards are personalized in the system at the same time. In yet another embodiment, the force applied by the foil tipper is varied using a controllable spring (not shown).

In several embodiments, appropriate preprinting of the card using the printer module 110 and embossing of the card using the embosser 114 replaces foil tipping operations. Using this method instead of foil tipping prevents the quick wear of foil tipped characters. With traditional foil tipping, the tipped metal can wear off in a rapid fashion. Using preprinting, an entire card surface can be painted or metallized with the foil print prior to embossing. When the surface is embossed or indented, it is now stronger because the most elevated portions of the characters have more than just foil tipping. The entire area surrounding the elevated portions can be the same color and/or material. In many embodiments, the print module prints using foil materials and/or inks of different colors. In many embodiments, the use of preprinting and embossing removes the need for the foil tipping station 118.

Figure 3A:
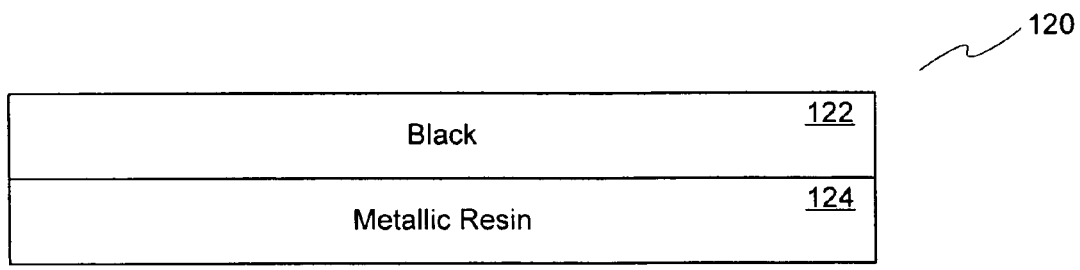
FIG. 3a is a top view of a printer ribbon in accordance with an embodiment of the invention.

Printer ribbons can be used by the printer module to personalize cards with personalization information. A top view of a printer ribbon in accordance with an embodiment of the invention is shown in FIG. 3*a*. The printer ribbon 120 includes a black portion 122 and a metallic resin portion 124. In operation, the printer module 110 of FIG. 2 can use the black portion 122 to provide background color, lettering, numbering, and/or other functions using the color black on the front and/or back sides of the card. Similarly, the printer module can use the metallic resin portion 124 to provide background color, lettering, numbering and/or other functions using metallic resin on the front and/or back sides of the card. In one embodiment, the printer ribbon 120 is used in indent and/or metallic printing by the printer module. The use of the dual portion printer ribbon having a metallic resin portion can avoid the need for the foil tipping station 118.

In many embodiments, the dual portion printer ribbon of FIG. 3*a* saves printer ribbon material. Typically, the printer module uses an ordinary black printer ribbon of card width to print lettering on the back side of a card and/or an ordinary metallized resin printer ribbon of card width to metallize embossed letters on the front side of the card. In such case, only a portion of either ordinary printer ribbon is used. In many embodiments, the black and metallized resin portions are used only for lettering confined to a region of the card. The unused portion of either ordinary printer ribbon is thus wasted material. The dual portion printer ribbon can reduce the wasted material by at least half.

Figure 3B:
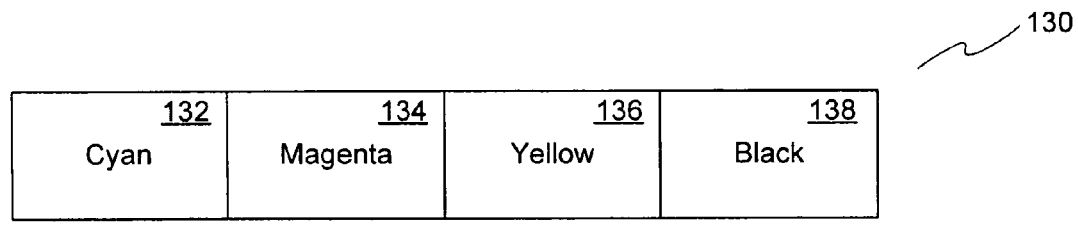
FIG. 3b is a top view of a printer ribbon in accordance with an embodiment of the invention.

A top view of a printer ribbon in accordance with an embodiment of the invention is shown in FIG. 3*b*. The printer ribbon 130 includes a cyan portion 132, a magenta portion 134, a yellow portion 136, and a black portion 138. In operation, printer module 110 of FIG. 2 can use the cyan 132, magenta 134, yellow 136, and/or black 138 portions in any possible combination or individually to provide background color, lettering, numbering, and/or other appropriate functions. In one embodiment, the portions are mixed or combined to generate other colors in a process called dye sublimation. With this selection of colors, nearly all colors can be produced by combination.

Figure 3C:
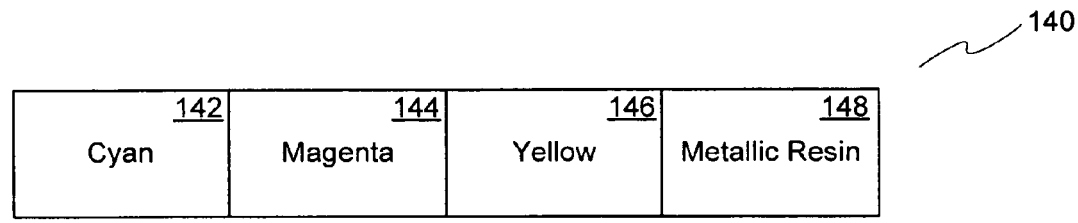
FIG. 3c is a top view of a printer ribbon in accordance with an embodiment of the invention.

A top view of a printer ribbon in accordance with an embodiment of the invention is shown in FIG. 3*c*. The printer ribbon 140 includes a cyan portion 142, a magenta portion 144, a yellow portion 146, and a metallic resin portion 148. In operation, printer module 110 of FIG. 2 can use the cyan 142, magenta 144, yellow 146, and/or metallic resin 148 portions in any possible combination or individually to provide background color, lettering, numbering, and/or other appropriate functions. In one embodiment, the portions are mixed or combined to generate other colors using dye sublimation. With this selection of colors, a large variety of colors can be produced by combining colors. The use of a printer ribbon including a metallic resin portion can avoid the need for the foil tipping station 118.

Figure 3D:
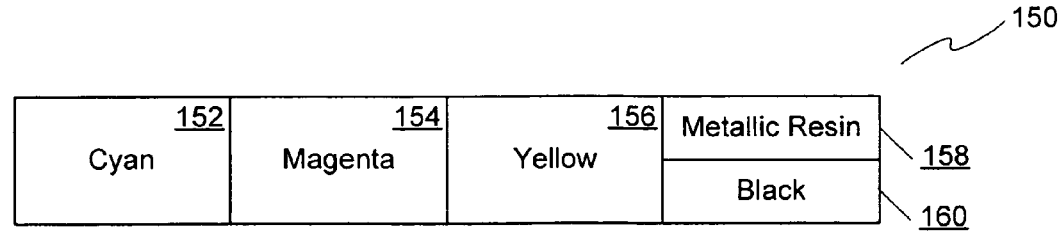
FIG. 3d is a top view of a printer ribbon in accordance with an embodiment of the invention.

A top view of a printer ribbon in accordance with an embodiment of the invention is shown in FIG. 3*d*. The printer ribbon 150 includes a cyan portion 152, a magenta portion 154, a yellow portion 156, a metallic resin portion 158, and a black portion 160. In operation, the printer module 110 of FIG. 2 can use the cyan 152, magenta 154, yellow 156, metallic resin 158 and/or black 160 portions in any possible combination or individually to provide background color, lettering, numbering, and/or other appropriate functions. In one embodiment, the portions are mixed or combined to generate other colors using dye sublimation. With this selection of colors, a large variety of colors can be produced by combining colors. The use of a printer ribbon including a metallic resin portion can avoid the need for the foil tipping station 118. As stated previously in the discussion of FIG. 3*a*, a dual portion printer ribbon, including portions such as the metallic resin portion 158 and the black portion 160, can reduce wasted printer ribbon material.

Figure 4:
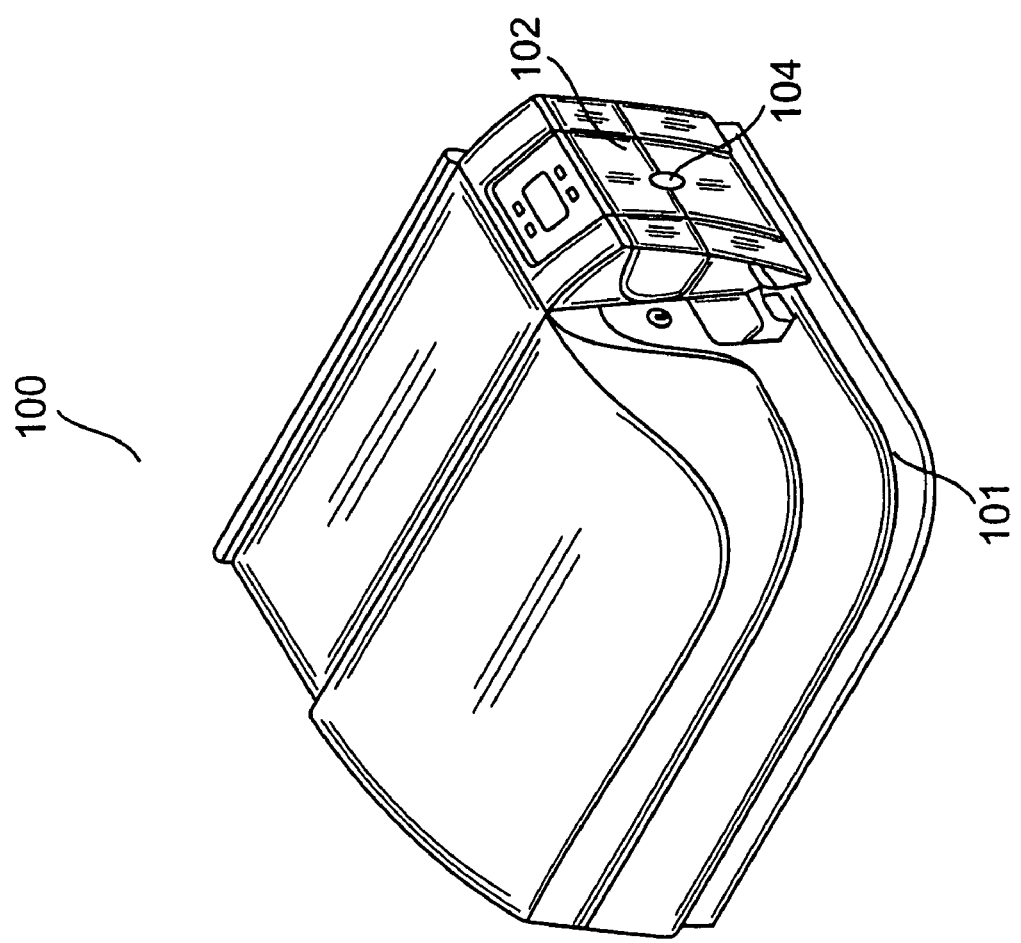
FIG. 4 is a perspective view of the card personalization system of FIG. 2 in accordance with an embodiment of the invention.

A perspective view of the card personalization system of FIG. 2 in accordance with an embodiment of the invention is shown in FIG. 4. The manual insertion slot 104 and retractable door for the dual card hopper 102 can be seen from this view. A plastic or metallic case 101 can enclose the card personalization system. In many embodiments the case 101 can be constructed from any variety of materials and is tamper resistant. In one embodiment, the case can be locked using a manual lock and/or software controlled locks. Furthermore, the case can include mounting holes to secure the card personalization system to a work surface and sensors to detect attempts to tamper with the case.

Figure 5:
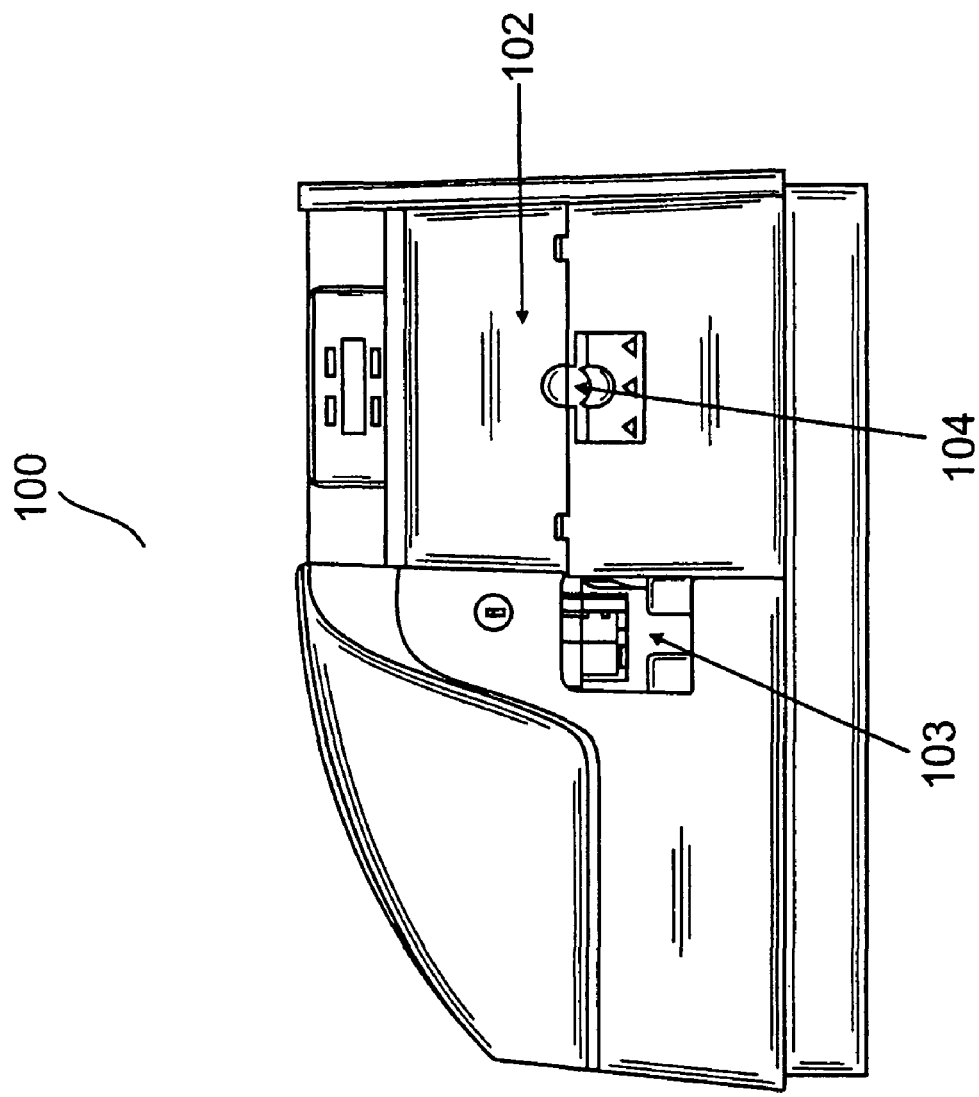
FIG. 5 is a front view of the card personalization system of FIG. 4.

A front view of the card personalization system of FIG. 4 is shown in FIG. 5. A card can be inserted into the manual insertion slot 104 to initiate the personalization process within the card personalization system. One or more cards may be placed within the machine by opening a retractable door to the dual card hopper 102 and placing the cards inside the hopper. When a card has been completed it can exit the machine via the card exit 103. In alternative embodiments, other methods of inserting a data card into the machine can be used.

Figure 6:
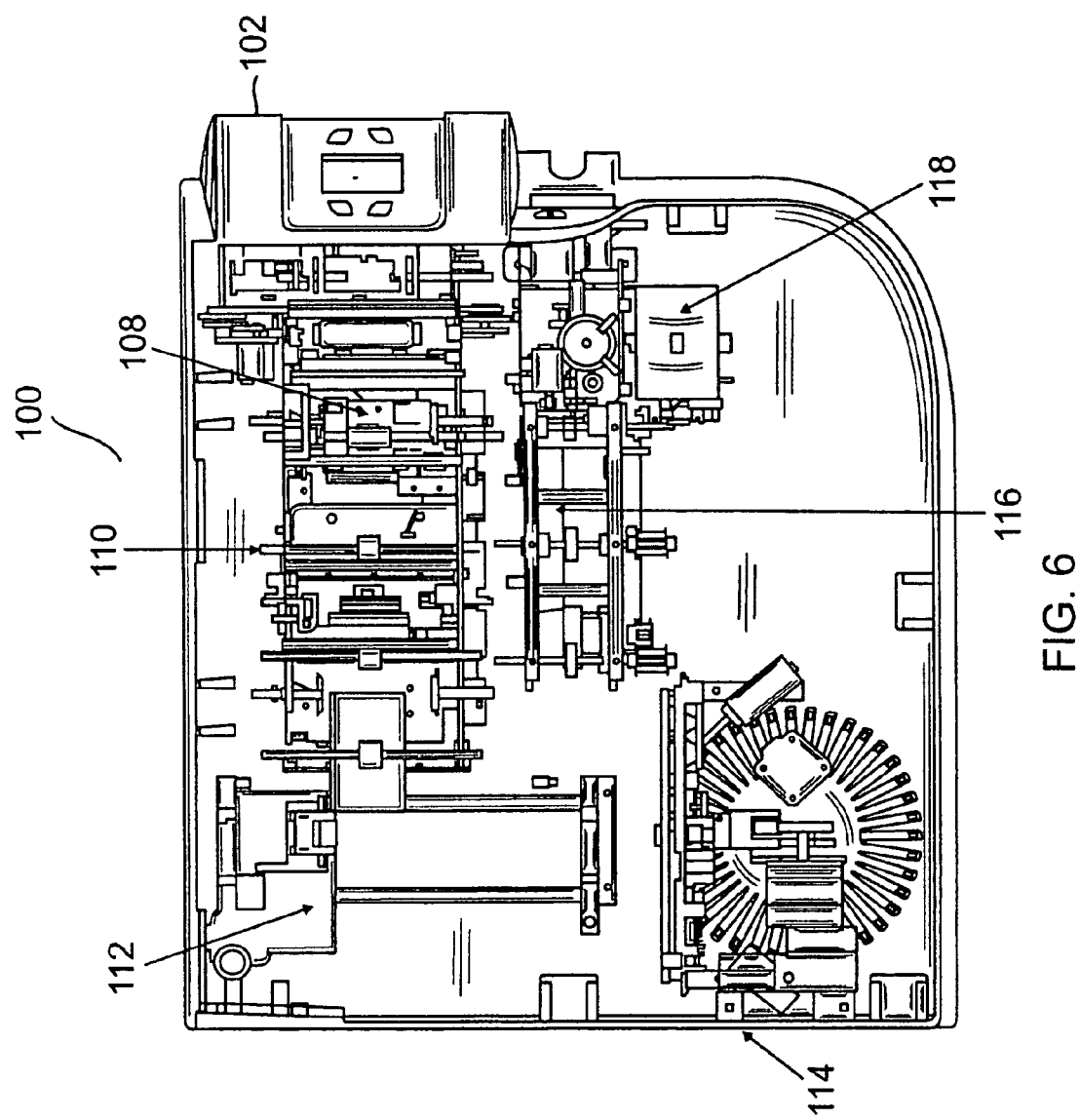
FIG. 6 is a plan view of the card personalization system of FIG. 4.

A plan view of a card personalization system of FIG. 4 without the top is shown in FIG. 6. FIG. 6 illustrates the physical relationship of the card hopper 102, encoder station 108, printer module 110, lateral card support 112, card embosser 114, magnetic fingerprint reference station 116, and foil tipping station 118. A card in the process of being personalized essentially follows the card path 107 as it is guided along the path and advanced where necessary. For instance, the card can enter the machine either through the manual insert slot 104 (shown in FIG. 4) or card hopper 102. The card can be advanced by motorized rollers in a first direction to the flipper station 106 and to and from the encoder station 108. The motorized rollers of the flipper station 106 (shown in FIG. 2) can advance the card to the printer module 110.

The motorized rollers of the lateral card transport 112 can advance the card from the printer module to the card embosser 114 in a second direction. The second direction being perpendicular to the first direction. The lateral card transport can also align the card so as to achieve horizontal level and straight entry into the embosser 114. An opto-sensor, not shown, can be used to align and confirm card edge parallelism and overall straight transport of the card on the path. The motorized rollers of the lateral card transport 112 can advance the card in a third direction from the embosser to the magnetic fingerprint reference station 116. The third direction being parallel to the first direction. The motorized rollers can also advance the card to the foil tipping station 118 and eventually to a card exit.

Figure 7:
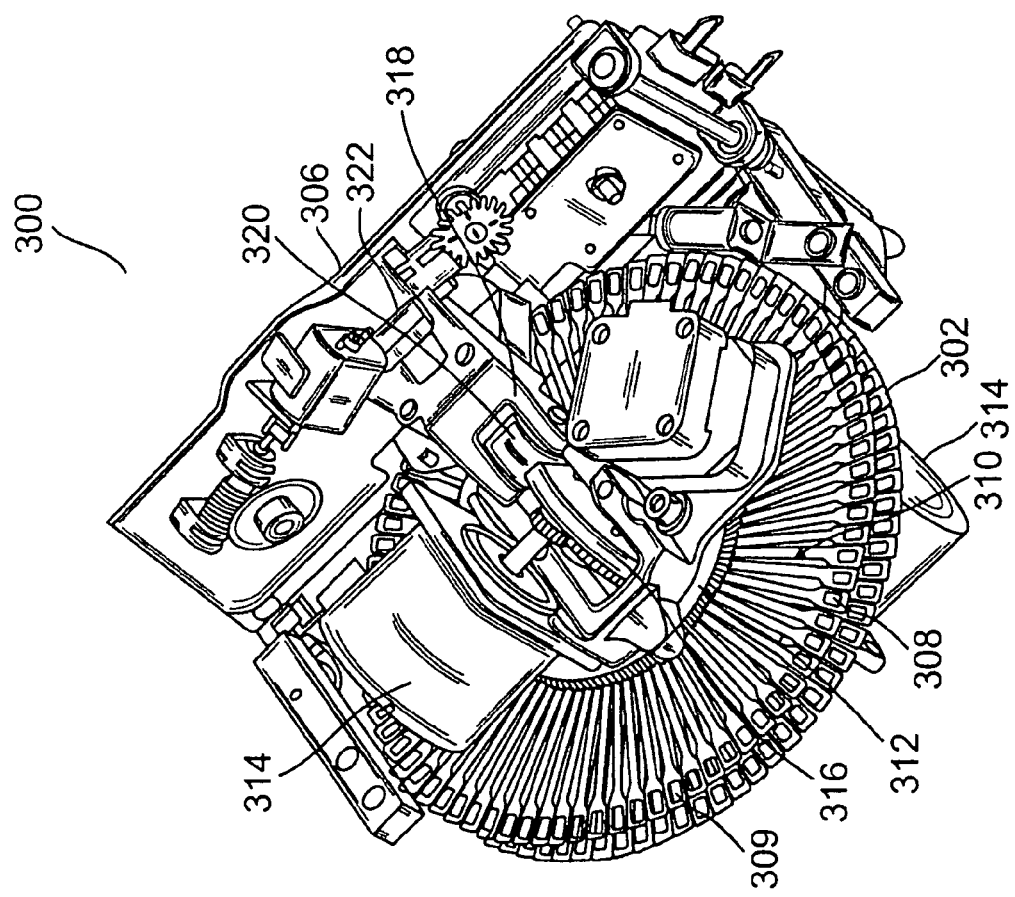
FIG. 7 is a perspective view of a card embosser in accordance with an embodiment of the invention.

A perspective view of a card embosser in accordance with an embodiment of the invention is shown in FIG. 7. The card embosser 300 includes two embosser wheels 302, two hammer drive mechanisms and infill media 306. The embosser wheels 302 can include a number of font elements 308 located at the ends of fingers 310 extending radially from a central ring 312. The hammer drive mechanisms can include motors 314, cams 316, pivot arms 318, rollers 320, and hammers 322.

In the illustrated embodiment, the mechanical force required to perform embossing is provided by the pair of motors 314. In other embodiments, a single motor can be used to drive both hammers. In the embodiment illustrated in FIG. 7, each hammer 322 is connected to a pivotally mounted pivot arm 318, which includes a roller 320 at the end of the pivot arm 318 opposite the hammer 322. The roller 320 rests on a cam 316 that is connected to a motor 314. The motor 314 is capable of rotating the cam 316 and the rotation of the cam 316 by the motor 314 pivots the pivot arm 318 and drives the hammer 322 into a radially extended finger 310. The ends of the fingers 310 each have a rectangular depression 309 on the outer side of the end, where the outer side is the side furthest from the fingers of the other embosser wheel. The hammer 322 has a mating rectangular protrusion 321 (see FIG. 8) configured to engage the rectangular depression 309 for each finger 310. In other embodiments, the depressions and protrusions can take other geometric shapes or engage in other ways including the depression being located in the hammer and the protrusion located on the ends of the figures of the embosser wheel. The font elements 308 are positioned on the inner side of the end of each finger, where the inner side is the side closest to the fingers of the other embosser wheel. When both motors drive the hammers into opposing fingers of the embosser wheel 302, the two fingers are driven together, in a mating fashion, and emboss a character on the data card. The font elements 308 at the end of each finger 310 each specify a different character to be embossed. The embosser wheels 302 can be rotated to select the characters to be embossed.

The punch cycle of the driving hammer can be varied to generate maximum torque at the end of the cycle. This can result in character by character tuning of the embosser. In many embodiments, the arrangement of the opposing flexible fingers having depressions configured to engage the hammer improves and/or ensures proper alignment of the hammer and font elements during the embossing process. In one embodiment, an opto-sensor can be used to maintain alignment of the card within the embosser. This can enable self-calibration during the embossment process. In one embodiment, the two motors can control the point of contact such that the point of contact is not at the midpoint or center point between the hammers. This can help ensure uniformity in embossing despite the variable quantity of force required to emboss a character. For example, an "8" typically requires more force to emboss or indent than a ".". In one embodiment, a force controller varies the force and point of contact of the hammers.

The fingers can be made of plastic, flexible metal or other suitable materials. The hammers, rollers, pivot arms, cams and other embosser components can be made of metal or other suitably rigid materials.

Figure 8:
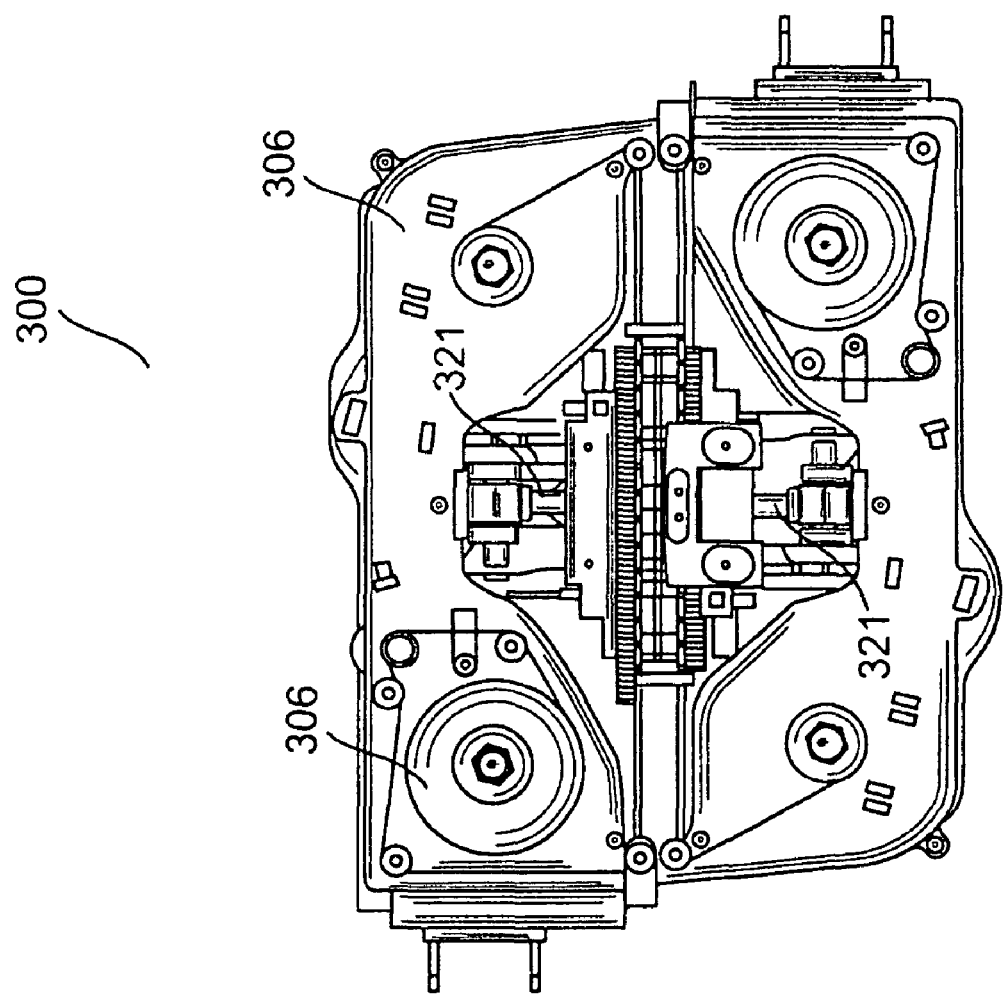
FIG. 8 is a front view of the card embosser of FIG. 7.

A front view of a card embosser in accordance with an embodiment of the invention is shown in FIG. 8. The card embosser 300 includes a pair of retractable cartridges 306 holding spooled ribbons of infill media or printer ribbons. Interposing a ribbon between font elements and the work piece can result in the infill media being transferred to the work piece during the embossing of the work piece. In one embodiment, the infill media is a single color ink on a Mylar ribbon carrier. In other embodiments, the infill media can be constructed with different colored inks and/or coloring agents and using different materials.

The cartridges can both occupy what can be referred to as an infill position. When a cartridge is in the infill position, then the ribbon will be struck by a font element during embossing transferring infill media to the work piece. Motors 314 (shown in FIG. 7) can pivot the frames on which the cartridges are mounted, displacing the cartridges to what can be referred to as a retracted position. In the retracted position, the ribbon does not impede the path of the font element to the work piece. When both cartridges are in the retracted position, no infill media will be transferred to the work piece during embossing. Movement of a cartridge from the infill position to the retracted position involves rotating of the cartridge toward the interior of the embosser about a pivot point located at one end of the cartridge. In one embodiment, the movement of the cartridge can be achieved using a motorized swing arm to pull the cartridge in a hinged line. In other embodiments, other actuating mechanisms and hinging configurations can be used. In many instances the actuating mechanism can be a solenoid.

In one embodiment, it is useful to vary the amount of force used to punch/emboss a character based on the style of character. For instance, punching a "." will typically require less force than punching an "8". In this way, only the required amount of force is used for each particular character. In addition, varying the point at which the font elements meet can improve the consistency of character emboss height. In one embodiment, the point at which the font elements meet is controlled by varying the timing of each of the motors 314 that drive the hammer 322. In one embodiment, the card embosser 114 is designed such that it is easily removed and changed out with a new one.

Figure 9:
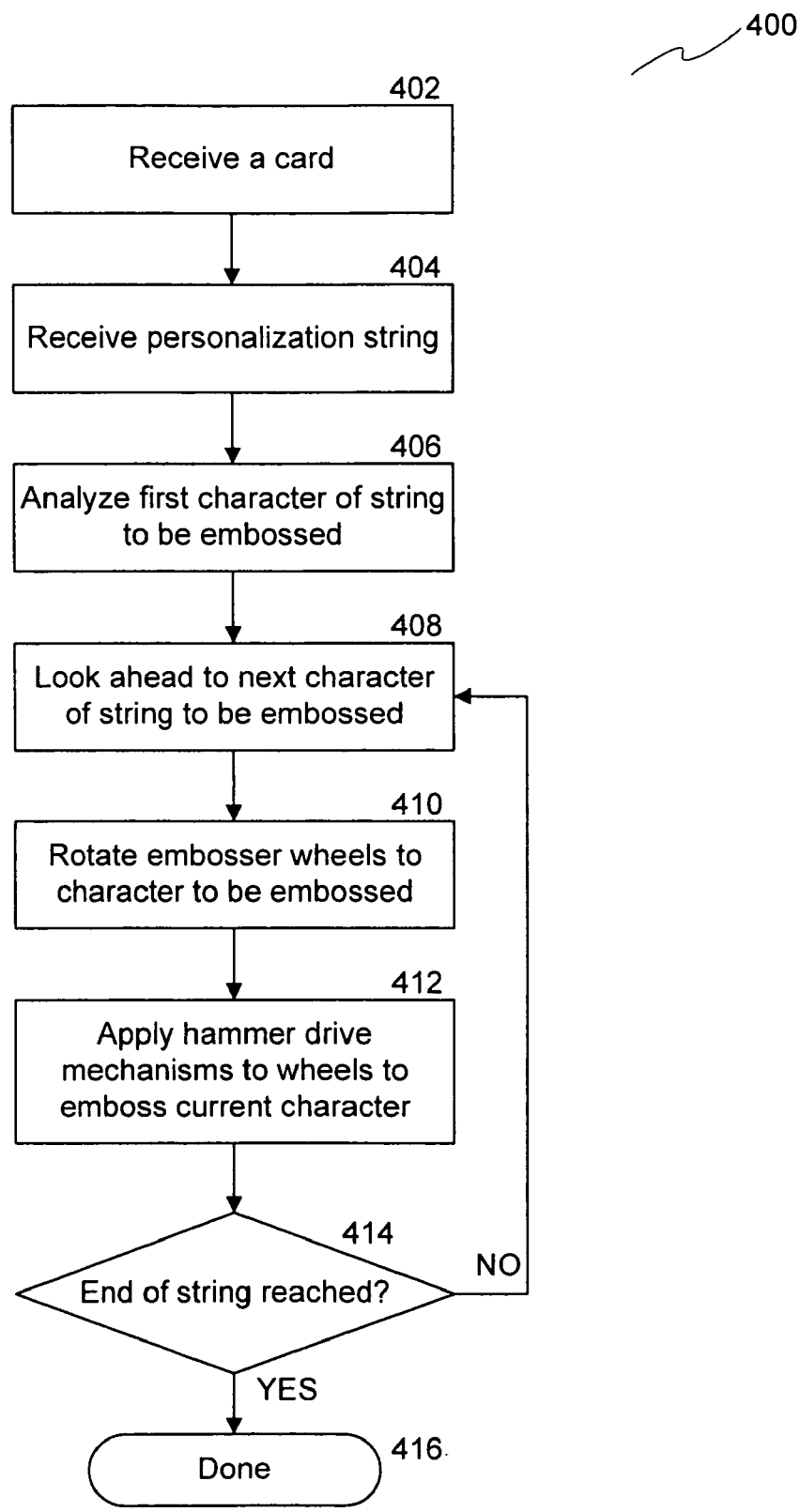
FIG. 9 is a flowchart of a process for embossing a card in accordance with an embodiment of the invention.

A flowchart of a process for embossing a card in accordance with an embodiment of the invention is shown in FIG. 9. The embosser 300 can receive a card 402. The embosser can then receive an associated personalization string 404. The embosser can then analyze the first character of the string to be embossed 406. The embosser can then look ahead to the next character of the string to be embossed 408. The embosser wheels can then be rotated for the character to be embossed 410. The hammer drive mechanisms can be applied to emboss the current character 412. If the end of the string is reached (414), then the process is done 416. Otherwise, the embosser can look ahead to the next character to be embossed, 408, and repeat the process. In other embodiments, other methods for embossing a string on a card can be used. Specifically, more efficient methods that take less time to complete the embossing process can be used. In one embodiment, the process can emboss characters out of sequence to improve timing. In a number of embodiments, the above processes are performed in different sequences. In several embodiments, a subset of the above processes are performed and/or additional processes are performed.

A block diagram of a memory system in accordance with an embodiment of the invention is shown in FIG. 10. Memory system 500 can be used by the card personalization system 100 to store card personalization information that can include credit card numbers, expiration dates, card user's name, pictures, voice samples, fingerprints, personal photographs, company logos, or any other personalization information that can be stored in a memory system. The card personalization information can be stored sequentially in the memory or using linked lists or other non-sequential data structures. The memory system 500 can also be used by the card embosser to implement any methods of embossing requiring memory. In one embodiment, the memory system 500 can take the form of a magnetic disk, magnetic tape, or digital memory. In another embodiment, the memory can store card personalization information, card embosser configuration information, and the mechanical characteristics of the system.

Figure 11:
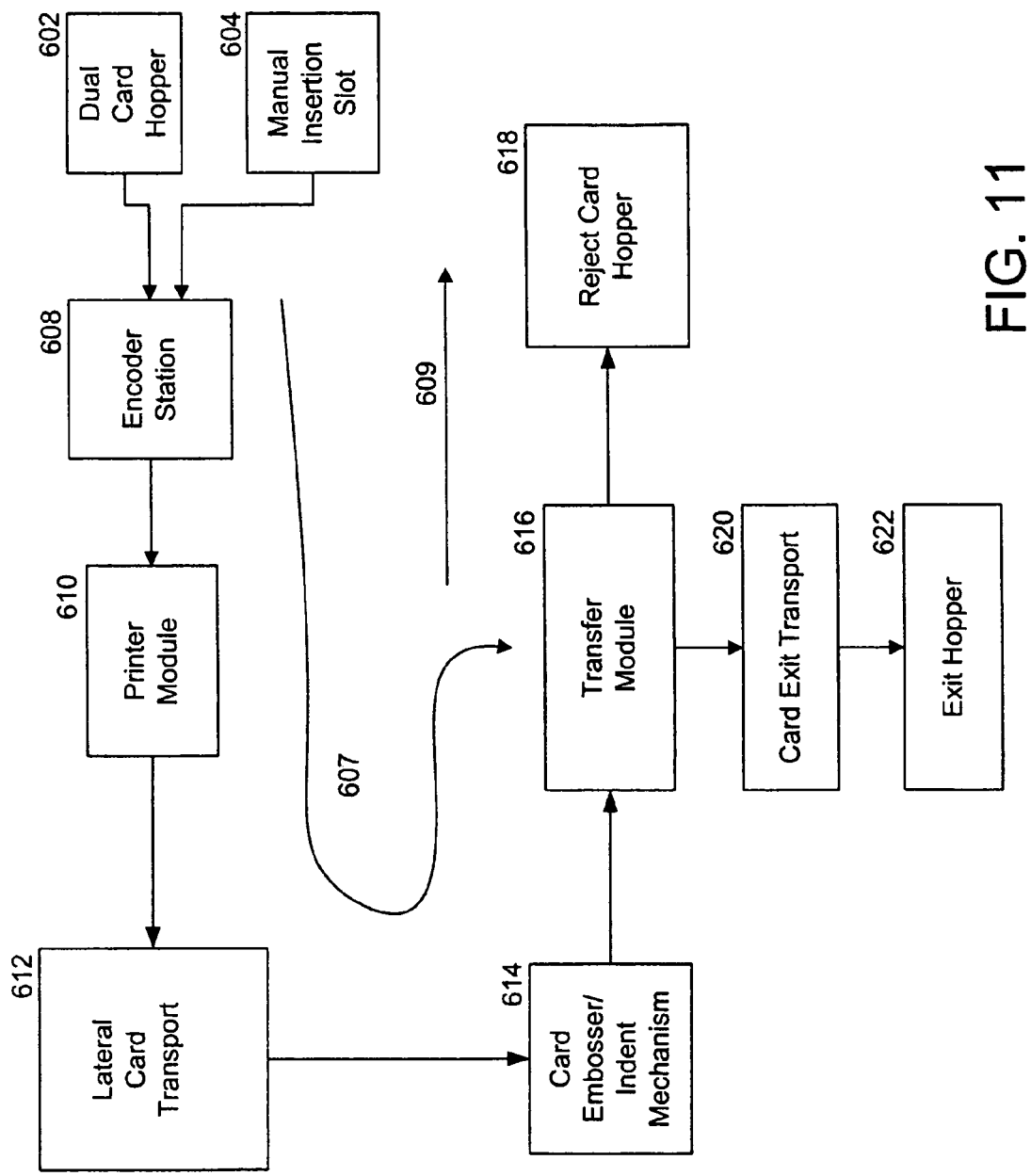
FIG. 11 is a block diagram of a card personalization system in accordance with an embodiment of the invention.

A block diagram of a card personalization system in accordance with an embodiment of the invention is shown in FIG. 11. The card personalization system includes a dual card hopper 602, a manual insertion slot 604, an encoder station 608, a printer module 610, a lateral card transport 612, a card embosser/indent mechanism 614, a transfer module 616, a reject card hopper 618, a card exit transport 620, an exit hopper 622 and card paths 607 and 609. The card personalization system can personalize a variety of cards, blank or pre-initialized. The cards to be personalized can include a magstripe card, a smart card, a contactless card (i.e. RFID card), or other suitable card. In operation, a card can follow the card path 607 when it is manually inserted into the manual insertion slot 604 or placed into the dual card hopper 602. The card can then be forwarded to the encoder station 608.

Once the card is encoded with some personalization information at the encoder station 608, the card can be forwarded to the printer module 610. Once personalization information has been printed to the card at the printer module, the card is forwarded to the lateral card transport 612. The lateral card transport can forward the card to the card embosser/indent mechanism 614. Once the card has been embossed and/or indented with personalization information, it can be forwarded to the transfer module 616.

The transfer module 616 can be programmed with predetermined criteria as to the requirements for an acceptable card. The transfer module can be either pre-programmed with acceptance criteria or it can receive the instructions for acceptance criteria during operation. In the event that the card does not meet the acceptance criteria, it is forwarded to the reject card hopper 618 along the card path 609. In the event that the card passes the acceptance criteria, the card is forwarded to the card exit module 620 which transports the card to the exit hopper 622. In many embodiments, the components of the card personalization system are modular and can be removed and/or additional components can be added. In addition, the order of the components may be rearranged.

In one embodiment, each hopper of the dual card hopper 602 can hold 50 cards. In other embodiments, the hoppers can hold more than or less than 50 cards.

The encoder station 608 can encode card personalization information on a variety of cards. The encoder station can encode personalization information on a card having a magnetic stripe (magstripe card). In one embodiment, the encoder station includes a magnetic fingerprint reader capable of capturing the magnetic fingerprint of the magstripe card in accordance with methods describes in the afore-mentioned U.S. Pat. No. 6,098,881. The encoder station is capable of communicating with other devices (i.e. server, central host) via a network or other means to acquire personalization information. The encoder can associate the personalization data of the intended card user with the card. For example, often personalization information for a credit card includes account number, expiration data, the name of the credit issuer, the type of card, etcetera. In one embodiment, the encoder reads the unique magnetic fingerprint of a card and sends the magnetic fingerprint information to the central host to be associated with the card user's financial or other identification related records. In such case, the same card can be personalized with some of the card user's personalization information such as the financial or other related records.

In one embodiment, the encoder station encodes a smart card having a number of electrical contacts on the card (i.e. IC card). The encoder station can include a similar arrangement of electrical contacts configured to engage the electrical contacts of the smart card. Once engaged, the encoder station can encode personalization information to the smart card.

In one embodiment, the encoder station encodes a contactless card. Encoding of the contactless card can be achieved without contacting the contactless card. In one embodiment, the encoder communicates with the contactless card using radio frequency communications. In several embodiments, the encoder uses the RFID method to communicate with a contactless card. In many embodiments, the encoder communicates with the card using other known methods of wireless communication. In other embodiments, the encoder station is capable of encoding any type of card that can be encoded with personalization information. Although in many embodiments, the encoder station is streamlined to support a single type of card.

Once the card has been through the encoding station, it enters the printer module 610. The printer module 610 can print graphics in either monochrome or color via a printer. In one embodiment, the printer uses a D2T2 thermal process to print on to the card. In other embodiments, other color schemes and other thermal processes can be used. In several embodiments, the card may be returned to a flipper station (not shown in FIG. 11) and rotated again to allow the printer module to print on both the front and/or back sides of the card. The printer module can use any of the printer ribbons depicted in FIGS. 3a-3d for printing card personalization information onto the card.

Once the card has been through the printer module, it enters the lateral card transport 612. The lateral card transport 612 can advance the card from the print module towards the card embosser/indent mechanism 614. In one embodiment, the lateral card transport holds and positions the card while the embosser/indent mechanism operates on the card.

The card embosser/indent mechanism 614 can emboss, indent and/or print card personalization information as required on either side of a card in accordance with the description of FIG. 7.

Once the card has been through the card embosser/indent mechanism, it enters the transfer module 616. The transfer module 616 determines whether the card meets predetermined acceptance criteria or queries a database to determine an acceptance criteria. If the transfer module determines that the card meets predetermined acceptance criteria then it forwards the card to the card exit transport 620. The card exit transport 620 can transport the card to the exit hopper 622. If the transfer module determines that the card does not meet the acceptance criteria, then it forwards the card to the reject card hopper 618. Once the card is in the exit hopper or the reject card hopper, an operator can retrieve the card as necessary.

In one embodiment, the transfer module includes a foil tipping station. In the event that the card meets the acceptance criteria and requires foil tipping, the foil tipping station acts to apply foil to the requisite portion(s) of the card using a hot stamp process.

Figure 12:
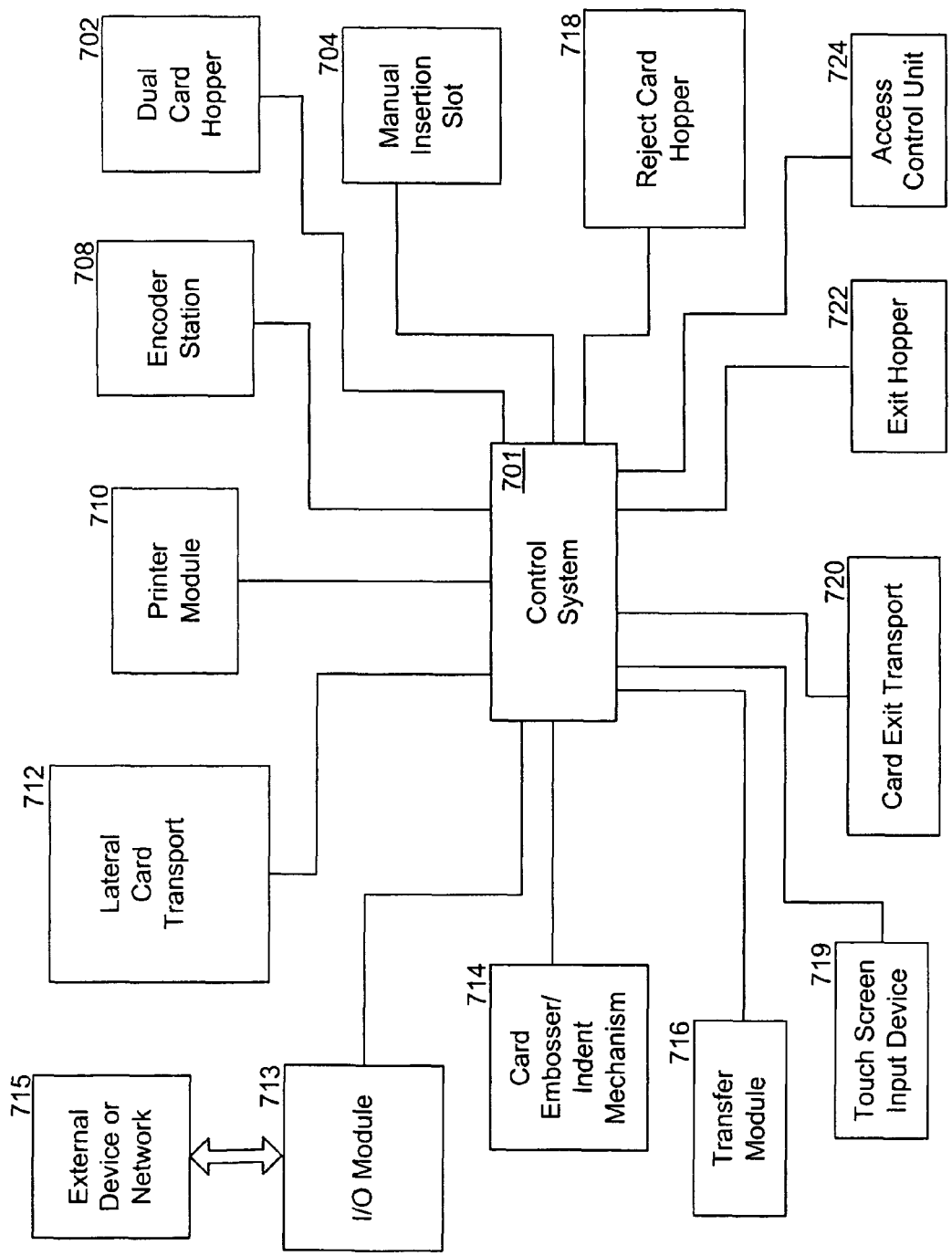
FIG. 12 is a schematic block diagram of a card personalization system in accordance with an embodiment of the invention.

Each of the components of the card personalization system can be in physical and/or electrical communication with a control system. FIG. 12 shows a schematic block diagram of a card personalization system including a control system in accordance with an embodiment of the invention. The card personalization system includes a control system 701, a dual card hopper 702, a manual insertion slot 704, an encoder station 708, a printer module 710, a lateral card transport 712, an input/output (I/O) module 713, a card embosser/indent mechanism 714, a transfer module 716, a touch screen 719, a card exit transport 720, an exit hopper 722, an access control unit 724, a reject card hopper 718, and an external device or network 715. The control system 701 is connected to the dual card hopper 702, manual insertion slot 704, encoder station 708, printer module 710, lateral card transport 712, input/output (I/O) module 713, card embosser/indent mechanism 714, transfer module 716, touch screen 719, card exit transport 720, exit hopper 722, access control unit 724, and reject card hopper 718. The I/O module 713 is connected to the external device or network 715. In one embodiment, the I/O module 713 is wirelessly connected to the external device or network 715.

The control system can be implemented using any combination of microprocessors, memory, discrete logic components, data buses and/or other processing elements that share information. In one embodiment, the control system includes devices capable of driving a number of stepper motors. In one embodiment, the control system controls the flow of power to each of the components connected to it and can disable any of those components. In one embodiment, the control system communicates information to each of the components connected to it.

In operation, the control system 701 communicates with the external device or network 715 via the I/O module 713 to access or store information related to card personalization. The external device or network 715 can be a central host or server or other computing device. The method of communication can include Ethernet, fiber optic, wireless or any other communication method known in the art for communicating between two computing devices.

The access control unit 724 can include a magnetic fingerprint card reader. The card personalization operator can swipe an authorized magstripe card to enable the operation of the card personalization unit and/or to gain access to the inside of the card personalization system. The control system 701 can disable all or some of the components that it communicates with until it has determined that the security information from the swiped operator card matches information on a predetermined authorized operator list. To verify that an operator is authorized to operate and/or to obtain access to the inside of the card personalization unit, the control system 701 can query either a memory local to the card personalization device or control system or an external database available from the external database or network 715 via the I/O module 713. In one embodiment, the control system verifies that the magnetic fingerprint of the swiped card is authorized.

In one embodiment, the operator uses the touch screen input device 719 to enter access code information in addition to, or in place of, swiping a magstripe card. In this way, the control system determines whether or not the machine operator is authorized to personalize a card.

The touch screen 719 can also be used to enter personalization information such as the intended card holder's name or other identifying information. The control system can use the identifying information to retrieve any or all of the intended card holder's records, if available, from the server or central host. In one embodiment, the operator can enter all the card personalization information necessary to personalize a card using the touch screen. In one embodiment, the card owner can use the touch screen to personalize the card according to the owner's personal preferences. For example, the card user could select a background, the card font, and/or pictures to be placed on the card. In one embodiment, the touch screen is implemented using a liquid crystal display or LCD. In other embodiments, other materials or components suitable to enabling touch screen input can be used.

The I/O module can be implemented using any combination of microprocessors, memory, discrete logic components, data buses or other processing elements that share information. The I/O module communicates with the control system via any number of communication methods that can include buses, protocols, serial connections or any combination thereof.

Figure 13:
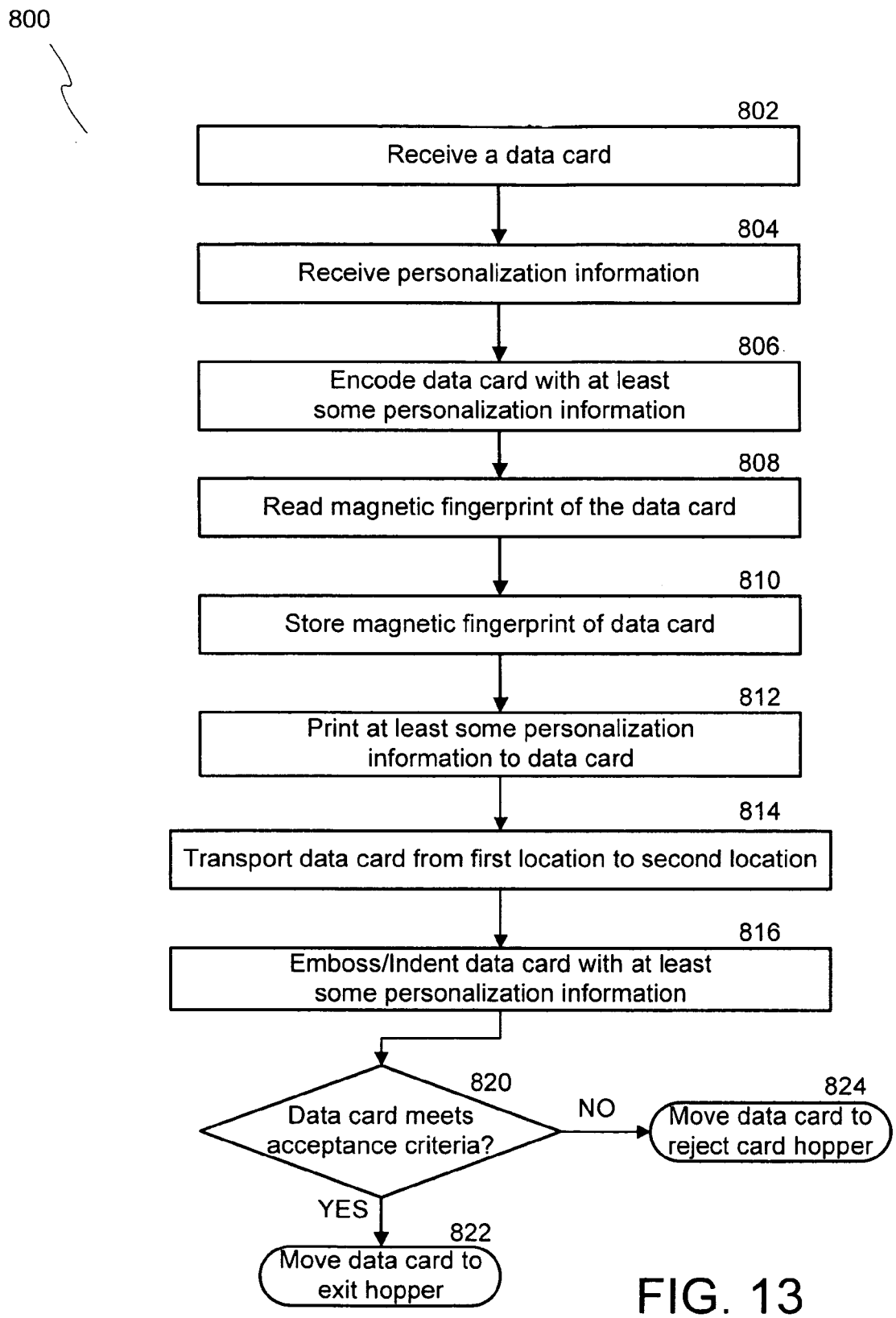
FIG. 13 is a flowchart of a process for personalizing a data card in accordance with an embodiment of the invention.

A flowchart of a process for personalizing a data card in accordance with an embodiment of the invention is shown in FIG. 13. The process 800 starts when the card personalization system receives a data card 802. The system receives personalization information 804. The system encodes the data card with at least some of the personalization information 806. The system reads the magnetic fingerprint of the data card 808. The system stores the magnetic fingerprint of the data card 810. The system prints at least some of the personalization information to the data card 812. The system transports the data card from a first location to a second location 814. The system embosses or indents the data card with at least some of personalization information 816. The system then determines whether the data card meets a predefined acceptance criteria 820. In one embodiment, the system is programmed with the predetermined acceptance criteria. In another embodiment, the system queries an external database to determine the predetermined acceptance criteria. If the data card meets the acceptance criteria, then the system moves the data card to an exit hopper 822. If the data card does not meet the acceptance criteria, then the system moves the data card to a reject card hopper 824. In many embodiments, the system processes any number of data cards. In many embodiments, the data card is transported from a first location to a second location a number of times to enable various steps of the process 800.

A flowchart of a process for communicating with a card personalization system in accordance with an embodiment of the invention is shown in FIG. 14. The process 850 begins when the server receives a request for personalization information including information identifying a card user from a card personalization system 852. The server identifies a record having personalization information based on the information identifying the card user 854. The server sends personalization information to the card personalization system 856. The server receives magnetic fingerprint information for a data card associated with the card user from the card personalization system 858. The server stores the magnetic fingerprint information of the data card in conjunction with the record 860. In many embodiments, the server receives many requests and possibly simultaneously. In one embodiment, the server identifies a number of records based on the identification information having personalization information. In many embodiments, the server receives requests from and sends personalization information to a card personalization system acting as a client. In a number of embodiments, the above processes are performed in different sequences. In several embodiments, a subset of the above processes are performed and/or additional processes are performed.

Figure 15:
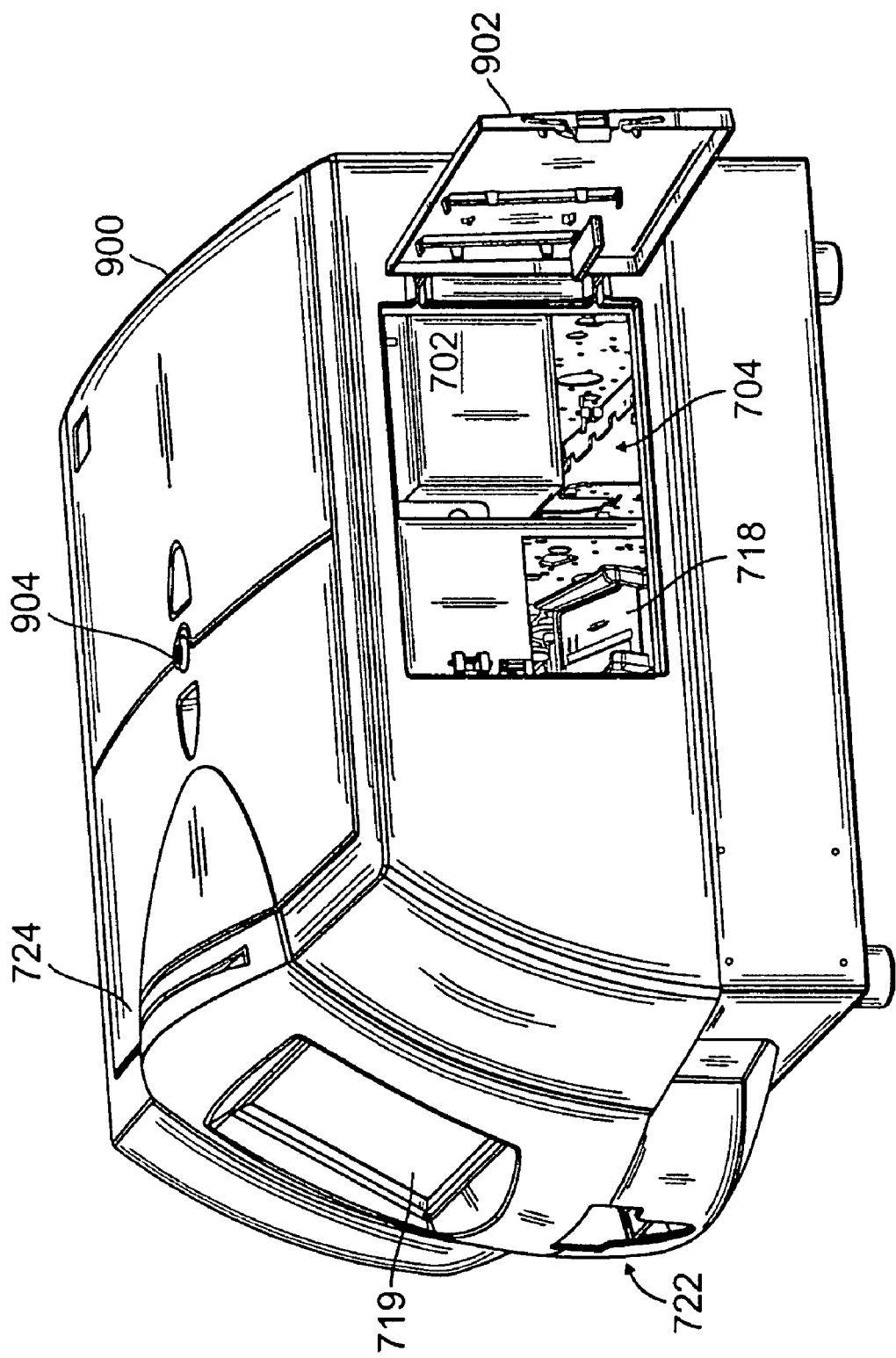
FIG. 15 is a perspective view of the card personalization system of FIG. 11 in accordance with an embodiment of the invention.

Returning to the physical structure of a card personalization system, a perspective view of the card personalization system of FIG. 11 in accordance with an embodiment of the invention is shown in FIG. 15. In addition to the components described previously, the card personalization system includes a plastic or metallic case 900, a security door 902, and a key lock 904. The door and key lock provide security measures that ensure only authorized access to the internal components of the system.

Figure 16:
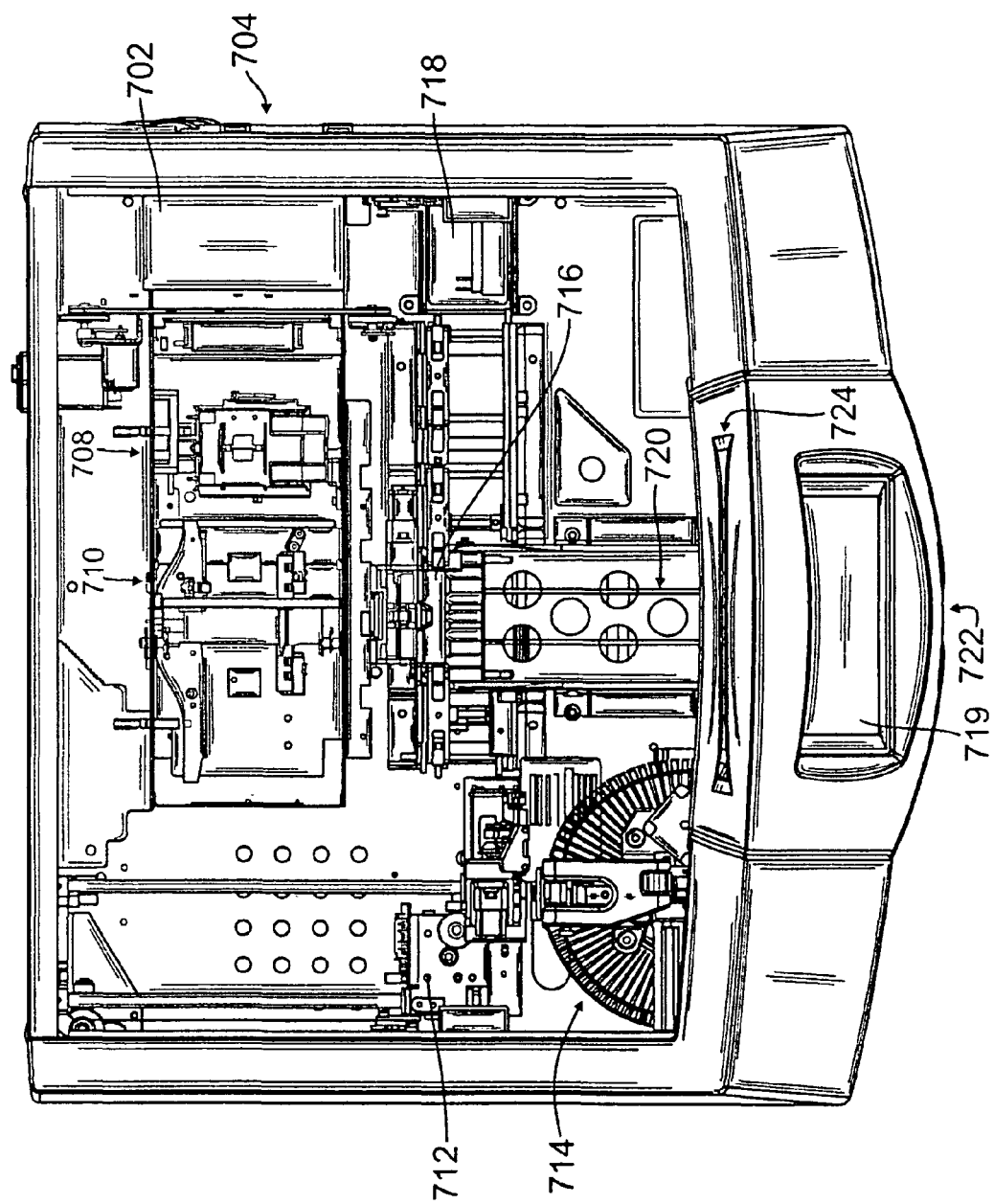
FIG. 16 is a plan view of the card personalization system of FIG. 15.

A plan view of the card personalization system of FIG. 15 without the top in accordance with an embodiment of the invention is shown in FIG. 16.

Variations, modifications, and other implementations of what is described herein will occur to those of ordinary skill in the art without departing from the spirit and the scope of the invention as claimed. Although the invention has been described with respect to certain embodiments, it should be recognized that the invention includes the claims and their equivalents supported by this disclosure.

What is claimed is:

1. A card personalization system comprising:
   a card receiver configured to receive one or more data cards;
   a control system connected to the card receiver, the control system configured to receive personalization information;
   an encoder system connected to the control system, the encoder system configured to encode the one or more data cards with at least some portion of the personalization information;
   a printer connected to the control system, the printer configured to print at least some portion of the personalization information to the one or more data cards; and
   the printer configured to print using a printer ribbon comprising one or more portions, where at least one portion include a metallized resin portion, 2. The card personalization system of claim 1, wherein the control system is configured to communicate with a server.

3. The card personalization system of claim 2, wherein the control system is configured to receive personalization information from the server.

4. The card personalization system of claim 1, further comprising a camera connected to the control system, the camera configured to acquire personalization information or to identify an authorized user of the card personalization system.

5. The card personalization system of claim 1, further comprising a fingerprint scanner connected to the control system, the fingerprint scanner configured to acquire personalization information or to identify an authorized user of the card personalization system.

6. The card personalization system of claim 1, further comprising a microphone connected to the control system, the microphone configured to acquire personalization information or to identify an authorized user of the card personalization system.

7. The card personalization system of claim 1, further comprising a retina scanner connected to the control system, the retina scanner configured to acquire personalization information or to identify an authorized user of the card personalization system.

8. The card personalization system of claim 1, further comprising an input device connected to the control system, the input device configured to enable a card user to customize one of the one or more data cards or to identify an authorized user of the card personalization system.

9. The card personalization system of claim 8, wherein the input device comprises a touch screen.

10. The card personalization system of claim 1, wherein the control system is configured to determine whether any one of the one or more data card meets a predetermined acceptance criteria.

11. The card personalization system of claim 1, wherein the one or more portions comprise a black portion and a metallized resin portion.

12. The card personalization system of claim 11, wherein the printer ribbon has a rectangular shape having two short sides and two long sides, the two short sides comprising a beginning and an end, and wherein the black portion and the metallized resin portion are rectangular and extend from the beginning to the end of the printer ribbon.

13. The card personalization system of claim 1, wherein the one or more portions comprise a cyan portion, a magenta portion and a yellow portion.

14. The card personalization system of claim 13, wherein the one or more portions further comprise a black portion.

15. The card personalization system of claim 13, wherein the one or more portions further comprise a portion divided into a half black portion and a half metallized resin portion.

16. The card personalization system of claim 1, wherein the one or more portions further comprise a portion divided into a half black portion and a half metallized portion.

17. A method of personalizing a data card, comprising:
   receiving a data card;
   receiving personalization information;
   encoding the data card with at least some portion of the personalization information;
   reading a magnetic fingerprint of the data card;
   storing the magnetic fingerprint; and printing at least some portion of the personalization information to the data card using a printer ribbon comprising a metallized resin portion.

18. The method of claim 17, further comprising communicating with a server.

19. The method of claim 18, wherein receiving personalization information comprises receiving personalization information from the server.

20. The method of claim 18, further comprising sending the magnetic fingerprint to the server.

21. The method of claim 17, further comprising identifying an operator authorized to personalize the data card.

22. The method of claim 17, wherein receiving personalization information comprises receiving personalization information from a device configured to accept input from a user.

23. The method of claim 17, wherein the printer ribbon further comprises a black portion.

24. A method of personalizing a data card, comprising:
receiving a data card;
receiving personalization information;
encoding the data card with at least some portion of the personalization information;
reading a magnetic fingerprint of the data card;
storing the magnetic fingerprint; and
embossing the data card with at least some portion of the personalization information using two driving hammers.

25. The method of claim 24, further comprising controlling the point of contact between the two driving hammers such that the point of contact is not at the midpoint.

26. The method of claim 24 wherein embossing the data card with at least some portion of the personalization information comprises varying a punch cycle to generate maximum torque at the end of the cycle.

27. The method of claim 24, wherein embossing the data card with at least some portion of the personalization information comprises:
receiving a personalization string of one or more characters;
analyzing a first character of the string to be embossed;
looking ahead to the next character in the string to be embossed;
rotating one or more embosser wheels; and
applying one or more drive hammers.

28. The method of claim 17, further comprising determining whether the data card meets a predetermined acceptance criteria.

29. A method of personalizing a data card comprising:
receiving a data card;
receiving personalization information;
encoding the data card with at least some portion of the personalization information;
reading a magnetic fingerprint of the data card;
storing the magnetic fingerprint;
printing at least some portion of the personalization information to the data card including at least one character of the personalization information using a foil print;
transporting the data card from a first location to a second location;
embossing or indenting the data card with at least some portion of the personalization information including the at least one character; and
determining whether the data card meets a predetermined criteria and, if not, rejecting the card.

30. A method of communicating with a card personalization system comprising:
receiving a request for personalization information, the request comprising information identifying a card user;
identifying a record based on-the-information identifying the card user, the-record comprising personalization information;
sending the personalization information;
receiving magnetic fingerprint information for a data card associated with the card user, wherein the magnetic fingerprint information comprises information indicative of unique characteristics of a magnetic stripe of the data card; and
storing the magnetic fingerprint information in conjunction with the record.

31. The method of claim 30, wherein the receiving a request for personalization information comprises receiving a request for personalization information from the card personalization system, and wherein the sending the personalization information comprises sending the personalization information to the card personalization system.

* * * * *